United States Patent Office 3,575,887
Patented Apr. 20, 1971

3,575,887
FLUORIDE-CONTAINING CRYSTALLINE ALUMINO-SILICATES
William B. Wilson, Pleasant Hill, Calif., assignor to Shell Oil Company, New York, N.Y.
No Drawing. Filed Mar. 19, 1968, Ser. No. 714,319
Int. Cl. B01j 11/78
U.S. Cl. 252—442                                15 Claims

ABSTRACT OF THE DISCLOSURE

A novel crystalline alumino-silicate containing fluorine incorporated into the crystalline structure is prepared by treatment of an alumino-silicate sequentially with a dilute non-fluoride acid solution followed by treatment with a halogen solution containing fluoride and chloride ions. The fluoride-containing alumino-silicates are highly active and stable hydroconversion catalysts especially when composited with a hydrogenative metal component.

BACKGROUND OF THE INVENTION

Field of the invention

This invention relates to hydrocarbon conversion catalysts. More particularly, the invention relates to a crystalline alumino silicate zeolite having fluoride incorporated into the crystal structure and a process of preparing and using the zeolite as a catalyst.

Description of the prior art

Heterogeneous catalysts of various types are of major importance in the conversion of hydrocarbons. Catalytic functions can be broadly described as hydrogenative and acidic. Acidic catalytic properties are especially important in cracking reactions and hydrogenation functions are important for hydrogenation catalysts. In many commercially significant catalysts, however, both acidic (cracking) and hydrogenative functions are desired in combination. The concept of dual functional catalyst is well known in the art and finds particular application in refining processes, such as hydrocracking, isomerization, hydrofining (which includes denitrification and desulfurization) and reforming (which includes ring opening, isomerization and cracking).

It is customary to accomplish dual catalytic functionality by supporting or otherwise incorporating a hydrogenative component in a solid refractory oxide support having acid activity. Thus, the support acts not only as a carrier for the hydrogenative component, but also as the acidic catalyst component. It is also customary to enhance the acidic properties of the support by addition by a halogen component.

To be effective the catalyst composite must not only possess a high degree of the desired catalytic activity and the proper balance of catalytic functions but must be able to retain activity and catalytic balance under processing conditions for sustained periods of time and must not be excessively sensitive to catalytic poisons.

In recent years attention has been directed to the catalytic properties of crystalline alumino-silicates, known generally as zeolites or molecular sieves. These materials have proved exceptionally suitable as acidic catalysts and as appropriate catalytic supports for dual functional catalysts.

A large number of synthetic crystalline zeolites have been prepared and are described in the patent and general literature. They are distinguished from each other on the basis of composition, crystal structure and adsorption properties The existence of a number of zeolites having similar but distinguishable properties advantageously permits the selection of one or more having optimum properties for a particular use. The exchange of and removal of metal in the crystal structure has proved an effective means of tailoring these materials to a specific functionality. Typical synthetic and natural alumino-silicates known in the art are summarized in Dwyer et al., U.S. 3,254,034. A particular form of zeolite known as mordenite is described, inter alia, in Benesi, U.S. 3,190,939.

While superior catalysts based on zeolitic materials have been discovered and described in the patent ilterature, little work has been reported on the enhancement of zeolitic acid activity by incorporation of acid activators such as halogens. The enhancement of acidity in the crystalline alumino-silicates is usually accomplished through changes in the crystalline structure or substitution of an integral metal cation for a hydrogen or acidic ion. With most zeolites the incorporation of halogen acid promoters is difficult owing to the fact that treatment of the zeolites with a strong acid collapses the crystalline structure, resulting in an amorphous material (see for example Rabo et al., U.S. 3,130,006). Mordenite is exceptional in this respect and seems better able to withstand strong acid treatment than zeolites of the class known as faujasites.

Thus, unlike amorphous refractory oxides which can be acid-activated by impregnation of halogen components from strong halogen acids, zeolites, particularly of the faujasite type, cannot be so treated.

Several means of enhancing the acidity of these catalysts have been proposed. Frilette et al., U.S. 3,033,778 describes the treatment of crystalline alumino-silicates with gaseous carbon dioxide. Mason et al., U.S. 3,137,656 describe the incorporation of an acid halide on crystalline alumino-silicates by treatment with an anhydrous halide. The resulting catalyst has enhanced activity but must be used in a carefully controlled anhydrous atmosphere to prevent stripping of the loosely held halide. Use in a wet atmosphere or treatment with an aqueous halide agent is disclosed as detrimental to catalyst activity.

The present invention is based on the discovery of a special preparative technique which results in a novel composition with intimate incorporation of fluoride into the crystalline structure of zeolites. The resulting fluoride-containing alumino-silicate possesses superior cracking activity and when composited with a hydrogenation component results in a highly active hydrocracking catalyst of exceptional process stability and selectivity.

SUMMARY OF THE INVENTION

It has now been discovered that fluorine can be coordinated into the crystalline structure and interacted with the aluminum ions of the crystal lattice to give a novel catalytic material with highly acidic character. Incorporation of fluoride into the structure prevents its easy removal during use as a catalyst and provides an unusually good acidic support for a hydrocracking catalyst. Moreover, the fluoride addition can be accomplished without serious detrimental effect on the crystalline structure.

In broad aspect the invention is a method of incorporating fluoride into a zeolitic crystalline alumino-silicate comprising the sequential treatment of a zeolite with a dilute non-fluoride acid followed by contacting with a solution of fluoride and chloride ions and drying and calcining the composite.

The resulting composite is reduced in alkali metal content, has fluoride intimately incorporated into the crystalline lattice and has high surface area and crystallinity.

In one embodiment the composite is also treated with an ammonium ion solution following the acid treatment and prior to incorporation of fluoride.

Crystalline alumino-silicates suitable for the invention include both natural and synthetic crystalline zeolites such as faujasites and mordenite. The most suitable and preferred alumino-silicates are zeolites of the faujasite class and especially synthetic zeolitic faujasite known as Y-sieve. Y-faujasite is well known and its preparation described in U.S. 3,130,007, issued Apr. 21, 1964.

The following explanation of the chemistry of the fluoride incorporation according to the invention is included for greater elucidation of the invention and not as a limitation thereof.

Both the structure and acidity of zeolites arise from the structural equivalence of aluminum and silicon in the three-dimensional network. The network is built upon tetrahedra and the incorporation of aluminum requires its tetrahedral coordination. The tetrahedral coordination of the aluminum involves a charge separation between negatively charged Al and a cation, and this gives rise to the acidity of the structure. The incorporation of fluorine into the network affects both the structural role of the aluminum and the genesis of its acidity. The interaction of fluorine with an aluminum atom, by virtue of its much higher electron affinity relative to the shared oxygen atom, destroys the tetrahedral coordination of the aluminum and the charge separation associated with it. This is shown schematically in the following reaction:

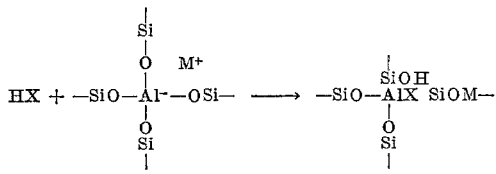

where X is initially chloride and then fluoride, as explained below. Aluminum so treated no longer contributes directly to the crystalline structure, and it no longer relies upon charge separation to provide acidity.

The aluminum is converted in a two-step process. First the aluminum atoms are converted from $sp^3$ tetrahedral coordination to $sp^2$ (trivalent) octahedral coordination. The acid exchange sites so created are then occupied by $F^-$ ions. This incorporation of $F^-$ is enhanced by competitive exchange against $Cl^-$ ions. At least partial removal of sodium from the crystalline structure is important and is accomplished by the acid treatment. Severe acid treatment of faujasites is detrimental to the structure and can cause partial or complete collapse of the crystalline structure unless dilute acids are used. In the activation-fluoridation of faujasites, change in aluminum coordination is of special importance as is maintenance of crystal structure and high surface area.

The surprising finding leading to the present invention is that the desired change in aluminum coordination can be effected without collapse of the crystal structure by careful treatment with dilute acid. Treatment of faujasites with strong acid, particularly hydrofluoric acid to incorporate fluorine directly, results in severe and often complete collapse of the crystalline structure leading to greatly reduced surface and loss of catalytic activity.

For the acid treatment according to the invention any dilute non-fluoride acid may be used. Hydrochloric acid, nitric acid and sulfuric acid have been used with success. Hydrochloric acid is preferred. The concentration of the acid is a critical factor and should not exceed about 1 Normal solution. Very low acid concentrations are less effective in removing sodium but this deficiency can be offset to some extent by prolonged treatment. The preferred range of acid concentration is between about 0.01 to 0.9 Normal solution and especially between 0.05 and 0.5 Normal. The effect of acid strength on surface area is illustrated in Example IV.

Particularly surprising is the effect of acid treatment temperature on surface area. While it would be expected that increased temperature during the acid treatment would decrease surface area, just the opposite has been found; over a range of 65° C. to 125° C. a slight increase in surface area with increasing temperature results. While the differences are not so great to markedly change the results, the higher range is preferred. Thus temperatures in the range of 150–200° C. for the acid treatment are preferred for the technique of the invention. Thus, with aqueous systems, superatmospheric pressures may be required.

The time required for the treatment is not critical and depends largely upon acid strength; longer times being required with more dilute acids to achieve the required change on aluminum coordination and removal of alkali metal (sodium). Acid treatment for a time exceeding about 10 minutes is usually sufficient. In one case using 0.05 Normal HCl solution and a treatment time of two days particularly good surface area retention was obtained.

In a preferred embodiment, the acid treated zeolite is contacted with an ammonium compound solution to aid removal of alkali metal. A preferred solution is $NH_4NO_3$. Sufficient treatment to reduce alkali metal (sodium) to below about 4% basis the dry composite is preferred. Complete removal of alkali metal leads to crystal structural collapse. Treatment with $NH_4NO_3$ for 0.5 to 2 hours at a temperature of about 100° C. is particularly suitable and preferred.

The solution of fluoride and chloride ions used for the fluoriding step should be neither highly acidic nor highly basic. A solution having a pH in the range of 6 to 8 is appropriate. A preferred solution consists of equimolar quantities of ammonium fluoride enhanced with hydrofluoric acid and ammonium chloride neutralized to a pH of 7–8 with ammonium hydroxide. Ammonium compounds are preferred in the halogen reaction since the ammonia may easily be removed by calcination, but other fluoride and/or chloride compounds may be used, in which case the cations should be removed by washing the fluorided composite with demineralized water.

Following the fluoriding step the composite should be dried and calcined. Drying is easily accomplished at a temperature of about 120° C. Temperature of the calcination should be about 500° C. and should not exceed about 850° C. Atmospheric pressure is suitable for the calcination treatment, pressure not being a variable of critical importance. The calcination may be carried out in a flowing stream of gas or in a static atmosphere, however, the use of a flowing stream speeds the procedure and is preferred. The time of calcining is not critical, but should be continued for sufficient time to remove water physically associated with the catalyst and to decompose any ammonia present—one hour should suffice but longer periods may be used. It is especially preferred that calcination be carried out for about 1–5 hours in a flowing stream of air at a temperature of about 600° C.

For many catalytic applications the novel fluoride-containing zeolitic material of the invention is preferably composited with a hydrogenative metal component such as, metals of Group VI-B (Cr, Mo or W) and Group VIII of the Periodic Table and mixtures thereof. Noble metals of Group VIII (Pt and Pd) are especially suitable. The hydrogenative metals may be incorporated by various means known in the art. Palladium, for instance, is conveniently incorporated by impregnation with ammoniacal palladium chloride solution. When noble metals of Group VIII are used, it is preferred that the metal content be about 2% w. or less. Catalyst containing 0.25–1.0% w. palladium on zeolite treated according to the invention provides a highly active and efficient hydrocracking catalyst.

Following incorporation of the metal hydrogenation component into the support, the catalyst is normally dried and calcined at a temperature of about 425° C. to 650° C. for one or two hours to form the finished catalyst. For many applications the metal may be converted to the sulfide form prior to use. Any method known in the art for sulfiding may be employed.

The catalysts are preferably used in the form of discrete particles, such as granules, extrudates, pellets and the like, usually ranging in size from about 1/16 inch to about ¼ inch in average diameter. These pellets are preferably disposed in a stationary bed within a suitable reactor capable of withstanding high pressure. Of course, smaller catalyst particles may be used in fluidized or slurry reactor systems. The catalysts of the invention are suitable for hydroconversion process, and particularly suitable for hydrocracking.

In a hydrocracking process utilizing catalysts prepared according to the invention, suitable feeds include hydrocarbon distillates preferably boiling above the boiling range of gasoline, for example, boiling in the range of about 200° C. to 510° C. It is also generally desirable to reduce or remove catalyst poisons from the feed by a suitable pretreatment. Poisons such as organic nitrogen, sulfur and oxygen and coke precursor are effectively reduced by mild hydrogenation treatment with a suitable catalyst. Catalysts prepared according to the invention are suitable, for such a mild hydrotreatment, the conditions being less severe than employed in hydrocracking. In general, for hydrocracking it is desirable to reduce feed organic sulfur to 0.1% w. or less and organic nitrogen to below 75 p.p.m. by weight and preferably below 50 p.p.m. by weight.

Operating conditions appropriate for a hydrocracking process using the present catalyst include temperatures in the range of about 260° to about 450° C., hydrogen partial pressures of about 750 to about 3000 p.s.i., liquid hourly space velocities of about 0.2 to about 10, preferably 0.5 to 5, and hydrogen to oil ratios of about 5 to about 50.

In the hyrocracking process, feed is introduced to the reaction zone as a liquid, vapor or mixed liquid-vapor phase, depending upon the temperature, pressure and amount of hydrogen mixed with the feed and the boiling range of the feed stock utilized. The hydrocarbon feed, including fresh as well as recycle feed, is usually introduced into the reaction zone with a large excess of hydrogen since the hydrocracking is accompanied by rather high consumption of hydrogen, usually of the order of 500 to 2500 standard cubic feet of hydrogen per barrel of feed converted. Conversion herein refers to the products obtained which boil below 215° C. Excess hydrogen is generally recovered, at least in part, from the reaction zone effluent and recycled to the reactor together with additional makeup hydrogen. Pure hydrogen is not necessary since any suitable hydrogen-containing gas which is predominantly hydrogen can be used. For example, hydrogen-rich gas containing on the order of 70% or more hydrogen which is obtained from a catalytic reforming process can be used. High purity gas is preferred.

Under normal conditions, total pressure employed in the hydrocracking zone will be in the range of from about 1000 to 3000 p.s.i.g. For a given partial pressure of hydrogen in the reaction zone, total pressure will depend upon such factors as purity of the hydrogen gas, hydrogen/oil ratio and the like. Too low a partial pressure of hydrogen tends to decrease catalyst life.

EXAMPLE I

To demonstrate the inapplicability of conventional halide impregnation to crystalline alumino-silicates, a decationized synthetic faujasite (available as the acid or "H" form from the Linde Company) was treated with an aqueous solution of hydrogen fluoride containing 0.11 g. of HF. The faujasite was treated for one hour at room temperature, dried and calcined in air.

The treated catalyst contained about 0.85% fluoride, however, X-ray diffraction measurements showed the catalyst to have lost at least 50% of its crystalline structure. A more concentrated solution resulted in almost complete destruction of the crystalline structure.

Ammonium bifluoride impregnation of both decationized and calcium exchange sieves produced similar results, resulting in about 0.85% fluoride incorporation and extensive loss of crystallinity.

Thus, conventional fluoride impregnation techniques, applicable to amorphous refractory oxide catalyst, are clearly not appropriate for fluoride addition to crystalline alumino-silicate faujasites.

EXAMPLE II

Several catalysts were prepared according to the invention. Sodium Y-zeolite obtained from the Linde Company (SK-40) was used as starting material for all the preparations. This material contained 8% w. sodium (basis dry zeolite), 12.2% aluminum and had a surface area of 610 m.$^2$/gm.

The sodium zeolite was first contacted with a HCl solution at 100° C. for one hour. This was followed by contacting four times with a 1 M NH$_4$NO$_3$ solution for one hour at 100° C. The material was then dried at 120° C. and fluorided by contacting with a solution consisting of NH$_4$F·HF and an equivalent amount of NH$_4$Cl which was brought to a pH of 8 with NH$_4$OH.

Two levels of HCl concentration and two levels of fluoriding were used.

The results are shown in the following table.

TABLE I

| | Treatment | | Analysis | | |
|---|---|---|---|---|---|
| | N HCl at 100° C. | Fluoride, total added as percent of catalyst | Na, percent | F, percent | $S_a$ m.$^2$/g |
| Catalyst: | | | | | |
| A | 0.5 | 2.5 | 0.92 | .07 | 490 |
| B | 0.5 | 5.0 | 1.0 | .17 | 550 |
| C | 0.2 | 2.5 | 1.4 | .16 | 515 |

Palladium was added to these respective composites to produce a dual functional catalyst. To all composites about 0.5% palladium was incorporated by ion exchange from a 0.05 M ammoniacal palladium chloride solution by total impregnation; a prescribed amount of solution to give the 0.5% w. palladium on the finished catalyst and enough to completely wet all the zeolite powder. The excess solution was evaporated.

The resulting catalysts were calcined in air at 550° C. and tested for hydrocracking activity with n-decane at 1200 p.s.i. hydrogen pressure, 30 hydrogen to decane mole ratio and variable space velocities.

The results are shown in Table II.

TABLE II

| | n-Decane activity [1] | Hydrocracking results selectivity | | | | |
|---|---|---|---|---|---|---|
| | | Iso/normal ratios | | | Ratio $C_5/C_3$ | Temp., °C. |
| | | $C_4$ | $C_5$ | $C_6$ | | |
| Catalyst: | | | | | | |
| A | 0.8 | 4.2 | 7.4 | 7.8 | 7.0 | 250 |
| B | 0.05 | 1.2 | 1.6 | 2.2 | 2.5 | 275 |
| C | 0.1 | 4.3 | 6.0 | 6.5 | 4.3 | 275 |

[1] Activity is defined as the space velocity required to give 50% conversion at 250° C.

The iso/normal ratios are used as a measure of catalyst selectivity. As can be seen, all the catalysts were highly active. Catalyst preparation A, activated most completely, had the highest activity. Catalysts B and C have lower activity (although exceptionally high compared to conventional catalysts) but very good iso/normal selectivity.

EXAMPLE III

The effect of acid concentration and temperature was investigated by preparing several composites in a manner described in Example II but with varying acid concentration, time and temperature. The results are shown in Table III.

TABLE III

| | Treatment | | | Properties [1] | | | |
|---|---|---|---|---|---|---|---|
| Experiment: | N HCl | Temp., °C. | Time, min. | Al [2], percent | Na, percent | F, percent | $S_a$,[3] m.²/g. |
| 1 | 0.1 | 50 | 10 | 12.1 | 7.7 | .91 | 615 |
| 2 | 0.1 | 50 | 120 | 12.9 | 8.2 | .96 | 600 |
| 3 | 0.1 | 100 | 10 | 13.0 | 8.0 | .92 | 645 |
| 4 | 0.1 | 100 | 120 | 12.8 | 8.1 | .98 | 630 |
| 5 | 0.9 | 50 | 10 | 12.1 | 2.8 | .65 | 390 |
| 6 | 0.9 | 50 | 120 | 12.3 | 3.0 | .89 | 340 |
| 7 | 0.9 | 100 | 10 | 12.0 | 2.8 | .51 | 395 |
| 8 | 0.9 | 100 | 120 | 12.3 | 2.5 | .94 | 425 |
| 9 | 0.5 | 75 | 65 | 13.2 | 4.1 | .92 | 490 |
| 10 | 0.5 | 125 | 60 | 12.5 | 4.0 | ([4]) | 540 |

[1] Samples routinely calcined overnight at 550° C.; analyses corrected for LOI which averaged around 1.0% for this series of samples.
[2] Sodium-free basis.
[3] All catalysts analysed showed the same high crystallinity on the basis of X-ray diffraction film powder diagrams.
[4] Not measured.

As can be seen by comparing Experiments 1 and 3 and Experiments 9 and 10 increasing temperature improves surface area retention. The effect of concentration is amply demonstrated; changing concentration from 0.1 N to 0.9 N at 50° C. and 10 minutes treatment time (exp. 1 and 5) reduces surface area from 615 to 390 m.²/g.

In all cases significant fluoride was incorporated into the zeolite structure.

EXAMPLE IV

A survey was also made of acid anions, as shown in Table IV. Aside from a somewhat greater loss of surface area through the use of nitric acid, there appears to be little to choose from between the three acids examined. Aluminum removal was not measured.

TABLE IV

| | | Properties | | |
|---|---|---|---|---|
| Acid | Treatment | Na, percent | F, percent | $S_a$, m.²/g. |
| 0.5 N HCl | 65 min. at 75° C | 4.1 | 0.9 | 490 |
| 0.5 N HNO₃ | do | 4.0 | 0.8 | 410 |
| 0.5 N H₂SO₄ | do | 4.3 | 1.1 | 480 |

I claim as my invention:

1. A method of preparing a catalytically active crystalline alumino-silicate containing fluoride incorporated into the crystalline structure which comprises contacting the alumino-silicate with a dilute aqueous solution of a non-fluoride acid at a temperature from 65 to 200° C. and a concentration between about 0.01 to 1.0. Normal to remove alkali metal; followed by contacting with an aqueous solution containing fluoride and chloride ions in a relative concentration such that acid exchange sites created by the non-fluoride acid treatment are occupied by fluoride ions and at a pH in the range of 6 to 8; then drying and calcining the resulting composite.

2. The method of claim 1 wherein the non-fluoride acid contact is effected at a temperature from 150–200° C., the resulting composite has a surface area of at least 400 m.²/g. and a fluorine content of at least 0.05% w.

3. The method of claim 2 wherein the acid in selected from the group consisting of hydrochloric, nitric and sulfuric acid.

4. The method of claim 1 wherein the fluoride containing alumino-silicate is composited with a hydrogenative metal component selected from the group consisting of Group VI–B, Group VIII of the Periodic Table and mixtures thereof.

5. The method of claim 2 wherein the solution of fluoride and chloride ions is prepared from ammonium fluoride, ammonium chloride, hydrofluoric acid and ammonium hydroxide and has a pH in the range of about 6 to 8.

6. The method of claim 2 wherein the alumino-silicate contains more than 4% w. alkali metal and is contacted with an ammonium compound solution for about 0.5 to 2 hours at a temperature of about 100° C. after contact with the dilute acid and the resulting composite has an alkali metal content of about 4% w. or less.

7. A composition comprising a crystalline alumino-silicate having fluoride incorporated into the crystalline structure in an amount of at least 0.05% w., an alkali metal content of less than 4% w. and a surface area of 400 m.²/g., the composition being prepared by contacting a crystalline alumino-silicate with an aqueous solution of a non-fluoride acid at a temperature from 65 to 200° C. and a concentration of about 0.01 to 1.0 Normal to remove the alkali metal; followed by contacting with an aqueous solution containing fluoride and chloride ions in a relative concentration such that acid exchange sites created by the non-fluoride acid treatment are occupied by fluoride ions, and at a pH in the range of 6 to 8; then drying and calcining the resulting composite.

8. The composition of claim 7 wherein the crystalline alumino-silicate contains more than 4% w. alkali metal and is contacted with an ammonium compound solution for about 0.5 to 2 hours at about 100° C. after contact with dilute acid and before contact with the solution of fluoride and chloride ions.

9. The method of claim 1 wherein the aqueous solution of fluoride and chloride ions is prepared by mixing equimolar quantities of ammonium fluoride enhanced with hydrofluoric acid and ammonium chloride and adjusting the pH to between 6 and 8 with ammonium hydroxide.

10. The composition of claim 7 wherein the aqueous solution of fluoride and chloride ions is prepared by mixing equimolar quantities of ammonium fluoride enhanced with hydrofluoric acid and ammonium chloride and adjusting the pH to between 6 and 8 with ammonium hydroxide.

11. The method of claim 4 wherein the hydrogenative metal component is between 0.25–1.0% w. palladium.

12. The composition of claim 7 wherein the fluoride containing alumino-silicate is composited with a hydrogenative metal component selected from the group consisting of Group VI–B, Group VIII of the Periodic Table and mixtures thereof.

13. The composition of claim 12 wherein the hydrogenative metal component is between 0.25–1.0% w. palladium.

14. The method of claim 6 wherein the ammonium compound solution is about 1 molar ammonium nitrate.

15. The composition of claim 8 wherein the ammonium compound solution is about 1 molar ammonium nitrate.

References Cited

UNITED STATES PATENTS

| 2,827,421 | 3/1958 | Erickson | 252—442X |
| 3,137,656 | 6/1964 | Mason et al. | 252—441X |
| 3,463,744 | 8/1969 | Mitsche | 252—442 |

PATRICK P. GARVIN, Primary Examiner

U.S. Cl. X.R.

208—111